United States Patent [19]

Yajima

[11] Patent Number: 4,920,635

[45] Date of Patent: May 1, 1990

[54] A METHOD OF MANUFACTURING A THERMO-SENSITIVE RESISTOR

[75] Inventor: Yasuhito Yajima, Nagoya City, Japan

[73] Assignee: NGK Insulators, Ltd., Japan

[21] Appl. No.: 212,477

[22] Filed: Jun. 28, 1988

Related U.S. Application Data

[63] Continuation-in-part of Ser. No. 035,433, Apr. 7, 1987, abandoned.

[30] Foreign Application Priority Data

May 7, 1986 [JP] Japan ............................... 61-103178

[51] Int. Cl.$^5$ .............................................. H01C 7/00
[52] U.S. Cl. .................................... 29/612; 338/195; 204/14.1; 204/192.21; 29/610.1
[58] Field of Search .............. 29/611, 612, 613, 610.1; 338/22 R, 195; 427/102, 103; 204/192.21, 14.1

[56] References Cited

U.S. PATENT DOCUMENTS

| | | | |
|---|---|---|---|
| 1,388,373 | 8/1921 | Richtmyer | 338/195 |
| 1,847,653 | 3/1932 | Jones et al. | 338/195 |
| 1,859,112 | 5/1932 | Silberstein | 338/195 |
| 2,942,331 | 6/1960 | Smiley | 29/620 |
| 3,607,679 | 9/1971 | Melroy et al. | 427/103 |
| 3,820,239 | 6/1974 | Nagata | 29/613 |
| 4,323,875 | 4/1982 | Tentarelli et al. | 338/25 |
| 4,712,085 | 12/1987 | Miki et al. | 338/22 R |

FOREIGN PATENT DOCUMENTS

| | | | |
|---|---|---|---|
| 207835 | 12/1982 | Japan | 29/612 |
| 62-62041 | 12/1987 | Japan | . |
| 1250202 | 10/1971 | United Kingdom | . |

OTHER PUBLICATIONS

Chemical Abstracts, vol. 79, No. 24, 12/17/73, p. 241.

Primary Examiner—P. W. Echols
Attorney, Agent, or Firm—Arnold, White & Durkee

[57] ABSTRACT

A thermo-sensitive resistor including an electrically insulating substrate, a thin-film heating resistor formed on the substrate and lead wires electrically connected to the thin-film heating resistor, wherein the resistance of the thin-film heating resistor is adjusted by increasing or decreasing a film thickness of a previously formed base thin-film heating resistor by means of an electroplating method or an electroless plating method, and thus the area for heating of the thermo-sensitive resistor can remain constant even if the resistance adjustment is performed.

16 Claims, 1 Drawing Sheet

A METHOD OF MANUFACTURING A THERMO-SENSITIVE RESISTOR

This application is a continuation-in-part of U.S. application Ser. No. 07/035,433 filed Apr. 7, 1987, which is now abandoned.

BACKGROUND OF THE INVENTION

1. Field of the Invention

The present invention relates to a thermo-sensitive resistor used, for example, for detecting an amount of fluid flow in an itnernal combustion engine by utilizing a thermal dependence of the resistance thereof.

2. Related Art Statement

Heretofore, an adjustment of resistance of such a thermo-sensitive resistor having a thin-film heating resistor formed by a sputtering method or an evaporation method has been performed by a laser trimming method as disclosed, for example, in Japanese Patent Laid-Open Publication No. 175,580/84.

However, if the resistance adjustment of a thin-film heating resistor having thickness variations is perfromed by the conventional laser trimming method, the trimming operation must be stopped when the resistance reaches a predetermined value. That is to say when adjusting the resistance of several thin-film resistors having the same planar dimensions but varying thicknesses, it is necessary to vary the trimming area of each resistor one at a time in order to adjust the resistance of each resistor to the same value. Accordingly, a drawback occurs in that the area for heating each resistor (i.e., the planar area of each resistor) is varied from resistor to resistor when the conventional laser trimming method is employed.

Moreover, as mentioned above, since the area for heating is varied between thermo-sensitive resistors, a temperature distribution of the thermo-sensitive resistor is varied from resistor to resistor correspondingly and a thermal diffusionability is also varied. Therefore, when an amount or speed of a fluid flow is to be detected by using the thermo-sensitive resistor mentioned above, characteristics, such as detection accuracy and response, of the detector utilizing the thermo-sensitive resistor are varied.

SUMMARY OF THE INVENTION

An object of the present invention is to eliminate the drawbacks mentioned above and to provide a thermo-sensitive resistor having a constant area for heating even if resistance adjustments are performed.

According to the invention, a thermo-sensitive resistor comprises an electrically insulating substrate having a cylindrical or plate shape, a thin-film heating resistor formed on a surface of said substrate, the resistance of which is adjusted by increasing or decreasing a film thickness of a base thin-film heating resistor previously formed on said substrate by means of an electroplating method or an electroless plating method, and lead wires connected electrically to said thin-film heating resistor, used for an electric connection with external elements and a mechanical support.

In the construction mentioned above, since the resistance adjustment is performed by increasing or decreasing a film thickness of the previously formed base thin-film heating resistor by means of electroplating, etc., the area for heating of the thermo-sensitive resistor can remain constant, even if the resistance adjustment is performed.

DESCRIPTION OF THE PREFERRED EMBODIMENT

Figure 1:
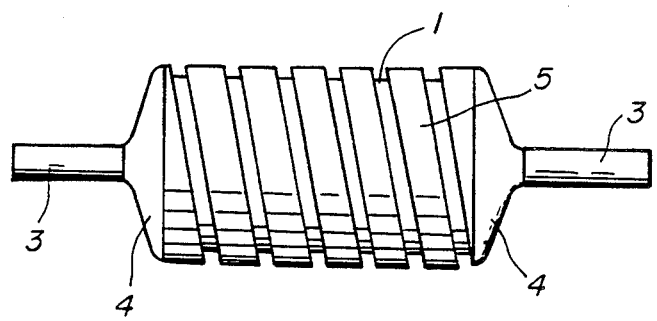
FIG. 1 is a schematic view showing one embodiment of a thermo-sensitive resistor according to the invention whose outer surface is not covered with a glass material.

Hereinafter, the feature of the present invention will be explained.

At first, a base thin-film heating resistor is formed on an electrically insulating substrate having a cylindrical or plate shape. In this case, the sputtering method is preferably used for good adhesion between the thin-film heating resistor and the substrate. Moreover, if simplicity of manufacturing method, simplicity of thin-film forming apparatus and low cost must be taken into consideration, the plating method is preferably used. Further, it is possible to use another thin-film forming technique such as the evaporation method.

Next, the thus obtained electrically insulating substrate having a cylindrical or plate shape on which the base thin-film heating resistor is formed is worked into a desired shape, and then lead wires are connected to the substrate for an electric conduction and a mechanical support to get an original thermo-sensitive resistor to be worked.

Next, in order to adjust the resistance of the thus obtained thermo-sensitive resistor to a predetermined value, the film thickness of the base thin-film heating resistor is increased or decreased by means of electroplating or electroless plating. In electroplating, the resistance of the thermo-sensitive resistor is preferably adjusted by changing a time of the plating operation under the condition that a density of direct current is maintained constant. Moreover, it is also possible to use the constant voltage controlling method. Further, in the electroplating method mentioned above, use is made of direct current, but alternating current may be applied during the electroplating operation to improve the connection strength and the accuracy of the resistance adjustment.

Moreover, in electroless plating, a surface of the base thin-film heating resistor is activated, preferably chemically and then the base thin-film heating resistor is immersed in an electroless plating solution for depositing a desired metal thereon and is removed at a predetermined resistance. Moreover, when the film thickness is to be decreased, an electrolytic elution can be preferably applied.

Further, after the lead wires are connected to the substrate for an electric conduction and a mechanical support to get an original thermo-sensitive resistor to be worked, it is possible to adjust the resistance of the thermo-sensitive resistor by increasing or decreasing the film thickness of the base thin-film heating resistor, while continuously monitoring the resistance through the lead wires. In this case, adjustment of the resistance can be precisely performed since the resistance is continuously monitored during the resistance adjustment operation. Thus, a large number of thermo-sensitive resistors can be easily manufactured without a large variation in resistance between the resistors.

Furthermore, in order to prevent the variation in resistance of the deposited or eluted thin-film heating resistor, a heat treatment may be applied to the thin-film heating resistor under a predetermined atmosphere and temperature. Moreover, the material of the thin-film heating resistor may be one or more kinds of Pt, Au, Cr, Mo, W and Ni which show good chemical stability, high strength and a high temperature coefficient of resistance. In this case, in order to improve the connection strength between the thin-film heating resistor and the substrate, it is possible to form an inexpensive metal layer on the substrate by the sputtering method and to deposit the metal having good chemical stability and a high temperature coefficient of resistance on the inexpensive metal layer by the plating method.

Figure 2:
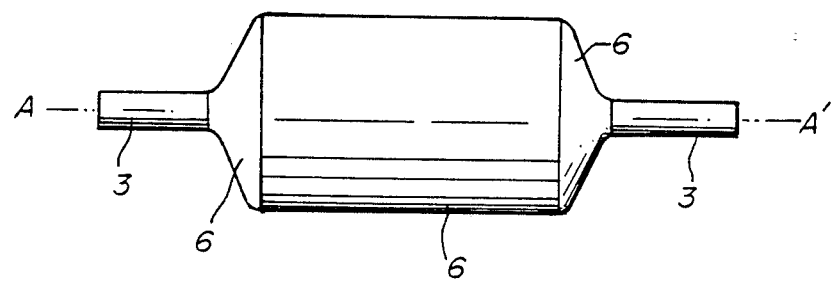
FIG. 2 is a schematic view illustrating another embodiment of a thermo-sensitive resistor according to the invention whose outer surface is covered with a glass material.
Figure 3:
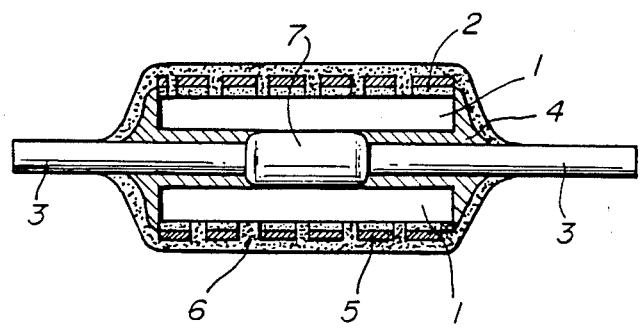
FIG. 3 is a cross sectional view depicting the embodiment cut along A—A' line in FIG. 2.

Hereinafter, the present invention will be explained with reference to the drawings. In the drawings, FIG. 1 is a schematic view showing one embodiment of a thermo-sensitive resistor according to the invention. FIG. 2 is a schematic view showing another embodiment of the thermo-sensitive resistor according to the invention whose outer surface is covered with a glass material. FIG. 3 is a cross sectional view showing the embodiment cut along A—A' line in FIG. 2.

Referring now to FIGS. 1–3, a photoresist (not shown) is formed in a spiral shape on an outer surface of an insulation tube 1 made of alumina ceramics having an outer diamter of 0.5 mm, an inner diameter of 0.2 mm and a length of 2 mm, and a thin-film heating resistor made of Pt having a thickness of about 0.1 microns is formed by the sputtering method on the outer surface of the insulation tube 1 and on a surface of the photoresist. Then, the photoresist is burned out to remove the Pt formed thereon and thus form a base thin-film heating resistor 2 having a spiral shape on the insulation tube 1.

Next, Pt lead wires 3 having a diameter of 0.15 mm are inserted into both end portions of the insulation tube 1 and separated by a space or insulative body 7. A space between the insulation tube 1 and the lead wire 3 is filled with a conductive paste 4 for an electric conduction and a mechanical support. Then, the heat treatment is performed at a temperature of 600°–1,100° C. After that, Pt plating layer 5 having a thickness of 0.1–0.5 microns is formed by the electroplating method on the base thin-film heating resistor 2 for a precise resistance adjustment, and then a further heat treatment is performed at a temperature of 600°–1,100° C.

Moreover, in the thermo-sensitive resistor for use in the detection of the flow amount or the flow speed of a fluid, the heat conductivity between the thermo-sensitive resistor and the fluid becomes small due to the adhesion of foreign substances such as dust on a surface of the thermo-sensitive resistor and thus the detection accuracy and the response are degraded. To prevent these disadvantages, it is preferable that a glass paste having a low melting point is painted on the surface of the thermo-sensitive resistor and the heat treatment is performed at a temperature of 500°–700° C. to form a glass coating layer 6 having a thickness below 20 microns, as shown in FIGS. 2 and 3. The glass coating layer 6 functions to make the surface of the thermo-sensitive resistor smooth, to decrease the adhesion of foreign substances such as dust to the surface of the thermo-sensitive resistor and to increase the adhesive force between the thin-film heating resistor and the substrate. Further, in the thermo-sensitive resistor for use in the detection of the flow amount or the flow speed of a fluid, the variation in the detection accuracy or the response can be decreased and thus the durability of the thermo-sensitive resistor can be improved.

As mentioned above in detail, according to the invention, since the resistance of the thin-film resistor can be adjusted without changing the area for heating of the thermo-sensitive resistor by increasing or decreasing the thickness of the thin-film heating resistor by using electroplating or electroless plating, the variation on the area for heating of the thermo-sensitive resistor can be decreased. Therefore, in the thermo-sensitive resistor for use in the detection of the flow amount or the flow speed of a fluid, a thermo-sensitive resistor having constant detection accuracy and response on the flow amount and the flow speed of a fluid can be manufactured on a large scale.

Further, according to the invention, since devices for manufacturing the thermo-sensitive resistor can be made simple in construction and inexpensive in cost, it is possible to decrease the manufacturing cost.

While the present invention has been described in conjunction with a few preferred embodiments thereof, it is understood that numerous changes and modifications may be resorted to without departing from the spirit and scope of the present invention.

What is claimed is:

1. A method of manufacturing a thermo-sensitive resistor comprising:
   providing a cylindrical or plate shape electrically insulating substrate;
   forming an initial thin-film heating resistor on a surface of said substrate;
   adjusting the resistance of said initial thin-film heating resistor to form a final thin-film heating resistor, said adjusting being performed by increasing or decreasing a film thickness of said initial thin-film heating resistor by means of an electroplating method or an electroless plating method without changing a width of said initial thin-film heating resistor; and
   electrically connecting lead wires to said thin-film heating resistor, said lead wires being used to electrically connect said resistor with external elements and to mechanically support said thermo-sensitive rsistor.

2. A method according to claim 1, further comprising forming a glass coat layer on said final thin-film heating resistor.

3. A method according to claim 1, wherein said initial thin-film heating resistor is formed on said substrate by at least one method selected from the group consisting of sputtering, evaporation or plating.

4. A method according to claim 1, wherein said initial thin-film resistor is formed from at least one material selected from the group consisting of Pt, Au, Cr, Mo, W, Ni and combinations thereof.

5. A method of manufacturing a thermo-sensitive resistor comprising:
   providing a cylindrical or plate shape electrically insulating substrate;
   forming a photoresist on an outer surface of said insulating substrate;
   depositing a thin-film heating resistor layer on the outer surface of said insulating substrate and on a surface of said photoresist;

burning out said photoresist to form an initial thin-film heating resistor having a desired shape;
connecting lead wires electrically to said initial thin-film heating resistor and mechanically to said insulating substrate via a conductive paste to form an assembly;
heating said assembly;
adjusting the resistance of said initial thin-film heating resistor to form a final thin-film heating resistor, said adjusting being performed by increasing or decreasing a film thickness of said initial thin-film heating resistor by means of an electroplating method or an electroless plating method without changing a width of said initial thin-film heating resistor; and
reheating said assembly.

6. A method according to claim 5, further comprising forming a glass coat layer on said final thin-film heating resistor.

7. A method according to claim 5, wherein said initial thin-film heating resistor is formed on said substrate by at least one method selected from the group consisting of sputtering, evaporation or plating.

8. A method according to claim 5, wherein said initial thin-film resistor is formed from at least one material selected from the group consisting of Pt, Au, Cr, Mo, W, Ni and combinations thereof.

9. A method of manufacturing a thermo-sensitive resistor comprising:
providing a cylindrical or plate shape electrically insulating substrate;
forming an initial thin-film heating resistor on a surface of said substrate;
electrically connecting lead wires to said thin-film heating resistor, said lead wires being used to electrically connect said resistor with external elements and to mechanically support said thermo-sensitive resistor; and
adjusting the resistance of said initial thin-film heating resistor, while said resistance is continuously monitored through said lead wires, to form a final thin-film heating resistor, said adjusting being performed by increasing or decreasing a film thickness of said initial thin-film heating resistor by means of an electroplating method or an electroless plating method without changing a width of said initial thin-film heating resistor.

10. A method according to claim 9, further comprising forming a glass coat layer on said final thin-film heating resistor.

11. A method according to claim 9, wherein said initial thin-film heating resistor is formed on said substrate by at least one method selected from the group consisting of sputtering, evaporation or plating.

12. A method according to claim 9, wherein said initial thin-film resistor is formed from at least one material selected from the group consisting of Pt, Au, Cr, Mo, W, Ni and combinations thereof.

13. A method of manufacturing a thermo-sensitive resistor comprising:
providing a cylindrical or plate shape electrically insulating substrate;
forming a photoresist on an outer surface of said insulating substrate;
depositing a thin-film heating resistor layer on the outer surface of said insulating substrate and on a surface of said photoresist;
burning out said photoresist to form an initial thin-film heating resistor having a desired shape;
connecting lead wires electrically to said initial thin-film heating resistor and mechanically to said insulating substrate via a conductive paste to form an assembly;
heating said assembly;
adjusting the resistance of said initial thin-film heating resistor, while said resistance is continuously monitored through said lead wires, to form a final thin-film heating resistor, said adjusting being performed by increasing or decreasing a film thickness of said initial thin-film heating resistor by means of an electroplating method or an electroless plating method without changing a width of said initial thin-film heating resistor; and
reheating said assembly.

14. A method according to claim 13, further comprising forming a glass coat layer on said final thin-film heating resistor.

15. A method according to claim 13, wherein said initial thin-film heating resistor is formed on said substrate by at least one method selected from the group consisting of sputtering, evaporation or plating.

16. A method according to claim 13, wherein said initial thin-film resistor is formed from at least one material selected from the group consisting of Pt, Au, Cr, Mo, W, Ni and combinations thereof.

* * * * *

UNITED STATES PATENT AND TRADEMARK OFFICE
CERTIFICATE OF CORRECTION

PATENT NO. : 4,920,635

DATED : May 1, 1990

INVENTOR(S) : Toru KIKUCHI et al.

It is certified that error appears in the above-identified patent and that said Letters Patent is hereby corrected as shown below:

Title page:

Change "[19] Yajima" to --[19] Kikuchi--; and change "[75] Inventor: Yasuhito Yajima, Nagoya City, Japan"

to --[75] Inventor: Toru Kikuchi and Yasuhito Yajima, both of

Nagoya City, Japan--.

Signed and Sealed this

Twenty-fifth Day of February, 1992

*Attest:*

HARRY F. MANBECK, JR.

*Attesting Officer*      *Commissioner of Patents and Trademarks*